(12) United States Patent
Kisin et al.

(10) Patent No.: US 8,484,069 B2
(45) Date of Patent: Jul. 9, 2013

(54) FORECASTING DISCOVERY COSTS BASED ON COMPLEX AND INCOMPLETE FACTS

(75) Inventors: Roman Kisin, San Jose, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/553,068

(22) Filed: Sep. 2, 2009

(65) Prior Publication Data
US 2009/0327049 A1 Dec. 31, 2009

Related U.S. Application Data

(63) Continuation-in-part of application No. 12/165,018, filed on Jun. 30, 2008, and a continuation-in-part of application No. 12/242,478, filed on Sep. 30, 2008.

(51) Int. Cl.
G06Q 10/00 (2012.01)
G06F 17/00 (2006.01)
G06G 7/00 (2006.01)

(52) U.S. Cl.
USPC ......... 705/7.35; 705/7.29; 705/7.11; 705/400

(58) Field of Classification Search
USPC .............................................. 705/7.11–7.42
See application file for complete search history.

(56) References Cited

U.S. PATENT DOCUMENTS

| | | | |
|---|---|---|---|
| 5,313,609 A | 5/1994 | Baylor et al. | |
| 5,355,497 A | 10/1994 | Cohen-Levy | |
| 5,608,865 A | 3/1997 | Midgely et al. | |
| 5,701,472 A | 12/1997 | Koerber et al. | |
| 5,875,431 A * | 2/1999 | Heckman et al. | 705/7.16 |
| 5,903,879 A | 5/1999 | Mitchell | |
| 5,963,964 A | 10/1999 | Nielsen | |
| 6,049,812 A | 4/2000 | Bertram et al. | |
| 6,115,642 A | 9/2000 | Brown et al. | |
| 6,128,620 A | 10/2000 | Pissanos et al. | |

(Continued)

FOREIGN PATENT DOCUMENTS

EP  2110781 A1  10/2009

OTHER PUBLICATIONS

PSS Systems, Inc., "Industry Leader PSS Systems Launches Third Generation of Atlas Legal Hold and Retention Management Software", pp. 1-2, www.pss-systems.com (Aug. 2007).*

(Continued)

*Primary Examiner* — Leland Marcus
*Assistant Examiner* — Richard Scheunemann
(74) *Attorney, Agent, or Firm* — Shumaker & Sieffert, P.A.

(57) ABSTRACT

The discovery cost forecasting system uses incomplete information to generate forecasts of discovery expenses. Models are generated with different levels of granularity depending upon the available facts and user preferences. An expert provides real-time information to improve the accuracy of the predictions. A scenario analysis is generated that evaluates how changes to the parameters of the matter could affect the forecasted cost. An estimate is generated of the degree of advancement of the matter in its lifecycle as part of the cost forecast. The cost associated with each data source and custodian is tracked and reported. A configurable and extensible cost equation is defined. A dashboard user interface is generated to monitor the entire portfolio to extract easy to understand facts, trends, and early warning signs related to discovery cost management.

22 Claims, 9 Drawing Sheets

U.S. PATENT DOCUMENTS

| | | | |
|---|---|---|---|
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,425,764 B1 | 7/2002 | Lamson | |
| 6,460,060 B1 | 10/2002 | Maddalozzo, Jr. et al. | |
| 6,539,379 B1 | 3/2003 | Vora et al. | |
| 6,553,365 B1 | 4/2003 | Summerlin et al. | |
| 6,607,389 B2 | 8/2003 | Genevie | |
| 6,622,128 B1 | 9/2003 | Bedell et al. | |
| 6,738,760 B1 | 5/2004 | Krachman | |
| 6,805,351 B2 | 10/2004 | Nelson | |
| 6,832,205 B1 | 12/2004 | Aragones et al. | |
| 6,839,682 B1 | 1/2005 | Blume et al. | |
| 6,944,597 B2 | 9/2005 | Callen et al. | |
| 6,966,053 B2 * | 11/2005 | Paris et al. | 717/143 |
| 6,976,083 B1 | 12/2005 | Baskey et al. | |
| 6,981,210 B2 | 12/2005 | Peters et al. | |
| 7,076,439 B1 | 7/2006 | Jaggi | |
| 7,082,573 B2 | 7/2006 | Apparao et al. | |
| 7,103,601 B2 | 9/2006 | Nivelet | |
| 7,103,602 B2 | 9/2006 | Black et al. | |
| 7,104,416 B2 | 9/2006 | Gasco et al. | |
| 7,107,416 B2 | 9/2006 | Stuart et al. | |
| 7,127,470 B2 | 10/2006 | Takeya | |
| 7,146,388 B2 | 12/2006 | Stakutis et al. | |
| 7,162,427 B1 | 1/2007 | Myrick et al. | |
| 7,197,716 B2 * | 3/2007 | Newell et al. | 715/760 |
| 7,206,789 B2 | 4/2007 | Hurmiz et al. | |
| 7,225,249 B1 | 5/2007 | Barry et al. | |
| 7,233,959 B2 | 6/2007 | Kanellos | |
| 7,240,296 B1 | 7/2007 | Matthews et al. | |
| 7,249,315 B2 | 7/2007 | Moetteli | |
| 7,281,084 B1 | 10/2007 | Todd et al. | |
| 7,283,985 B2 | 10/2007 | Schauerte et al. | |
| 7,284,985 B2 | 10/2007 | Genevie | |
| 7,292,965 B1 * | 11/2007 | Mehta et al. | 703/2 |
| 7,333,989 B1 | 2/2008 | Sameshima et al. | |
| 7,386,468 B2 | 6/2008 | Calderaro et al. | |
| 7,433,832 B1 | 10/2008 | Bezos et al. | |
| 7,451,155 B2 | 11/2008 | Slackman et al. | |
| 7,478,096 B2 | 1/2009 | Margolus et al. | |
| 7,496,534 B2 | 2/2009 | Olsen et al. | |
| 7,502,891 B2 | 3/2009 | Shachor | |
| 7,512,636 B2 | 3/2009 | Verma et al. | |
| 7,558,853 B2 | 7/2009 | Alcorn et al. | |
| 7,580,961 B2 | 8/2009 | Todd et al. | |
| 7,594,082 B1 | 9/2009 | Kilday et al. | |
| 7,596,541 B2 | 9/2009 | deVries et al. | |
| 7,614,004 B2 | 11/2009 | Milic-Frayling et al. | |
| 7,617,458 B1 | 11/2009 | Wassom, Jr. et al. | |
| 7,636,886 B2 | 12/2009 | Wyle et al. | |
| 7,720,825 B2 | 5/2010 | Pelletier et al. | |
| 7,730,148 B1 | 6/2010 | Mace et al. | |
| 7,742,940 B1 * | 6/2010 | Shan et al. | 705/7.31 |
| 7,774,721 B2 | 8/2010 | Milic-Frayling et al. | |
| 7,778,976 B2 | 8/2010 | D'Souza et al. | |
| 7,861,166 B1 | 12/2010 | Hendricks | |
| 7,865,817 B2 | 1/2011 | Ryan et al. | |
| 7,895,229 B1 | 2/2011 | Paknad | |
| 7,962,843 B2 | 6/2011 | Milic-Frayling et al. | |
| 8,073,729 B2 | 12/2011 | Kisin et al. | |
| 2001/0053967 A1 | 12/2001 | Gordon et al. | |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |
| 2002/0035480 A1 | 3/2002 | Gordon et al. | |
| 2002/0083090 A1 | 6/2002 | Jeffrey et al. | |
| 2002/0091553 A1 | 7/2002 | Callen et al. | |
| 2002/0091836 A1 | 7/2002 | Moetteli | |
| 2002/0095416 A1 | 7/2002 | Schwols | |
| 2002/0103680 A1 | 8/2002 | Newman | |
| 2002/0108104 A1 | 8/2002 | Song et al. | |
| 2002/0119433 A1 | 8/2002 | Callender | |
| 2002/0120859 A1 | 8/2002 | Lipkin et al. | |
| 2002/0123902 A1 | 9/2002 | Lenore et al. | |
| 2002/0143595 A1 | 10/2002 | Frank et al. | |
| 2002/0143735 A1 | 10/2002 | Ayl et al. | |
| 2002/0147801 A1 | 10/2002 | Gullotta et al. | |
| 2002/0162053 A1 | 10/2002 | Os | |
| 2002/0178138 A1 | 11/2002 | Ender et al. | |
| 2002/0184068 A1 | 12/2002 | Krishnan et al. | |
| 2002/0184148 A1 | 12/2002 | Kahn et al. | |
| 2003/0004985 A1 | 1/2003 | Kagimasa et al. | |
| 2003/0014386 A1 | 1/2003 | Jurado | |
| 2003/0018520 A1 | 1/2003 | Rosenfeld et al. | |
| 2003/0018663 A1 | 1/2003 | Cornette et al. | |
| 2003/0031991 A1 | 2/2003 | Genevie | |
| 2003/0033295 A1 | 2/2003 | Adler et al. | |
| 2003/0036994 A1 | 2/2003 | Witzig et al. | |
| 2003/0046287 A1 | 3/2003 | Joe | |
| 2003/0051144 A1 | 3/2003 | Williams | |
| 2003/0069839 A1 | 4/2003 | Whittington et al. | |
| 2003/0074354 A1 | 4/2003 | Lee et al. | |
| 2003/0097342 A1 | 5/2003 | Whittington | |
| 2003/0110228 A1 | 6/2003 | Xu et al. | |
| 2003/0139827 A1 | 7/2003 | Phelps | |
| 2003/0208689 A1 | 11/2003 | Garza | |
| 2003/0229522 A1 | 12/2003 | Thompson et al. | |
| 2004/0002044 A1 | 1/2004 | Genevie | |
| 2004/0003351 A1 | 1/2004 | Sommerer et al. | |
| 2004/0019496 A1 * | 1/2004 | Angle et al. | 705/1 |
| 2004/0034659 A1 | 2/2004 | Steger | |
| 2004/0039933 A1 | 2/2004 | Martin et al. | |
| 2004/0060063 A1 | 3/2004 | Russ et al. | |
| 2004/0068432 A1 | 4/2004 | Meyerkopf et al. | |
| 2004/0078368 A1 | 4/2004 | Excoffier et al. | |
| 2004/0088283 A1 | 5/2004 | Lissar et al. | |
| 2004/0088332 A1 | 5/2004 | Lee et al. | |
| 2004/0088729 A1 | 5/2004 | Petrovic et al. | |
| 2004/0103284 A1 | 5/2004 | Barker | |
| 2004/0133573 A1 | 7/2004 | Miloushev et al. | |
| 2004/0138903 A1 | 7/2004 | Zuniga | |
| 2004/0143444 A1 | 7/2004 | Opsitnick et al. | |
| 2004/0187164 A1 | 9/2004 | Kandasamy et al. | |
| 2004/0193703 A1 | 9/2004 | Loewy et al. | |
| 2004/0204947 A1 | 10/2004 | Li et al. | |
| 2004/0215619 A1 | 10/2004 | Rabold | |
| 2004/0216039 A1 | 10/2004 | Lane et al. | |
| 2004/0260569 A1 | 12/2004 | Bell et al. | |
| 2005/0060175 A1 | 3/2005 | Farber et al. | |
| 2005/0071251 A1 | 3/2005 | Linden et al. | |
| 2005/0071284 A1 | 3/2005 | Courson et al. | |
| 2005/0074734 A1 | 4/2005 | Randhawa | |
| 2005/0114241 A1 | 5/2005 | Hirsch et al. | |
| 2005/0125282 A1 | 6/2005 | Rosen | |
| 2005/0144114 A1 | 6/2005 | Ruggieri et al. | |
| 2005/0149307 A1 * | 7/2005 | Gurpinar et al. | 703/10 |
| 2005/0160361 A1 | 7/2005 | Young | |
| 2005/0165734 A1 | 7/2005 | Vicars et al. | |
| 2005/0187813 A1 | 8/2005 | Genevie | |
| 2005/0203821 A1 | 9/2005 | Petersen et al. | |
| 2005/0240578 A1 * | 10/2005 | Biederman et al. | 707/3 |
| 2005/0246451 A1 | 11/2005 | Silverman et al. | |
| 2005/0283346 A1 * | 12/2005 | Elkins et al. | 703/4 |
| 2006/0036464 A1 | 2/2006 | Cahoy et al. | |
| 2006/0036649 A1 | 2/2006 | Simske et al. | |
| 2006/0074793 A1 | 4/2006 | Hibbert et al. | |
| 2006/0095421 A1 | 5/2006 | Nagai et al. | |
| 2006/0126657 A1 | 6/2006 | Beisiegel et al. | |
| 2006/0136435 A1 | 6/2006 | Nguyen et al. | |
| 2006/0143248 A1 | 6/2006 | Nakano et al. | |
| 2006/0143464 A1 | 6/2006 | Ananthanarayanan et al. | |
| 2006/0149407 A1 * | 7/2006 | Markham et al. | 700/108 |
| 2006/0149735 A1 | 7/2006 | DeBie et al. | |
| 2006/0156381 A1 | 7/2006 | Motoyama | |
| 2006/0156382 A1 | 7/2006 | Motoyama | |
| 2006/0167704 A1 * | 7/2006 | Nicholls et al. | 705/1 |
| 2006/0174320 A1 | 8/2006 | Maru et al. | |
| 2006/0178917 A1 * | 8/2006 | Merriam et al. | 705/7 |
| 2006/0184718 A1 | 8/2006 | Sinclair et al. | |
| 2006/0195430 A1 | 8/2006 | Arumainayagam et al. | |
| 2006/0229999 A1 | 10/2006 | Dodell et al. | |
| 2006/0230044 A1 | 10/2006 | Utiger | |
| 2006/0235899 A1 | 10/2006 | Tucker | |

| | | | |
|---|---|---|---|
| 2006/0242001 A1* | 10/2006 | Heathfield | 705/10 |
| 2007/0016546 A1 | 1/2007 | De Vorchik et al. | |
| 2007/0048720 A1 | 3/2007 | Billauer | |
| 2007/0061156 A1 | 3/2007 | Fry et al. | |
| 2007/0061157 A1 | 3/2007 | Fry et al. | |
| 2007/0078900 A1 | 4/2007 | Donahue | |
| 2007/0099162 A1 | 5/2007 | Sekhar | |
| 2007/0100857 A1 | 5/2007 | DeGrande et al. | |
| 2007/0112783 A1 | 5/2007 | McCreight et al. | |
| 2007/0118556 A1 | 5/2007 | Arnold et al. | |
| 2007/0156418 A1 | 7/2007 | Richter et al. | |
| 2007/0162417 A1 | 7/2007 | Cozianu et al. | |
| 2007/0179829 A1* | 8/2007 | Laperi et al. | 705/9 |
| 2007/0203810 A1* | 8/2007 | Grichnik | 705/28 |
| 2007/0208690 A1 | 9/2007 | Schneider et al. | |
| 2007/0219844 A1 | 9/2007 | Santorine et al. | |
| 2007/0220435 A1 | 9/2007 | Sriprakash et al. | |
| 2007/0271308 A1 | 11/2007 | Bentley et al. | |
| 2007/0271517 A1 | 11/2007 | Finkelman et al. | |
| 2007/0282652 A1 | 12/2007 | Childress et al. | |
| 2007/0288659 A1 | 12/2007 | Zakarian et al. | |
| 2008/0033904 A1 | 2/2008 | Ghielmetti et al. | |
| 2008/0034003 A1 | 2/2008 | Stakutis et al. | |
| 2008/0059265 A1 | 3/2008 | Biazetti et al. | |
| 2008/0059543 A1 | 3/2008 | Engel | |
| 2008/0070206 A1 | 3/2008 | Perilli | |
| 2008/0071561 A1 | 3/2008 | Holcombe | |
| 2008/0091283 A1* | 4/2008 | Balci et al. | 700/90 |
| 2008/0126156 A1* | 5/2008 | Jain et al. | 705/7 |
| 2008/0147642 A1 | 6/2008 | Leffingwell et al. | |
| 2008/0148193 A1 | 6/2008 | Moetteli | |
| 2008/0148346 A1 | 6/2008 | Gill et al. | |
| 2008/0154969 A1 | 6/2008 | DeBie | |
| 2008/0154970 A1 | 6/2008 | DeBie | |
| 2008/0177790 A1 | 7/2008 | Honwad | |
| 2008/0195597 A1 | 8/2008 | Rosenfeld et al. | |
| 2008/0209338 A1 | 8/2008 | Li | |
| 2008/0229037 A1 | 9/2008 | Bunte et al. | |
| 2008/0262898 A1* | 10/2008 | Tonchev et al. | 705/10 |
| 2008/0294674 A1 | 11/2008 | Reztlaff et al. | |
| 2008/0301207 A1 | 12/2008 | Demarest et al. | |
| 2008/0312980 A1* | 12/2008 | Boulineau et al. | 705/7 |
| 2008/0319958 A1 | 12/2008 | Bhattacharya et al. | |
| 2008/0319984 A1 | 12/2008 | Proscia et al. | |
| 2009/0037376 A1 | 2/2009 | Archer et al. | |
| 2009/0043625 A1 | 2/2009 | Yao | |
| 2009/0064184 A1 | 3/2009 | Chacko et al. | |
| 2009/0094228 A1 | 4/2009 | Bondurant et al. | |
| 2009/0100021 A1 | 4/2009 | Morris et al. | |
| 2009/0106815 A1 | 4/2009 | Brodie et al. | |
| 2009/0119677 A1 | 5/2009 | Stefansson et al. | |
| 2009/0150168 A1 | 6/2009 | Schmidt | |
| 2009/0150866 A1 | 6/2009 | Schmidt | |
| 2009/0150906 A1 | 6/2009 | Schmidt et al. | |
| 2009/0157465 A1* | 6/2009 | Heathfield | 705/8 |
| 2009/0193210 A1 | 7/2009 | Hewett et al. | |
| 2009/0241054 A1 | 9/2009 | Hendricks | |
| 2009/0249179 A1 | 10/2009 | Shieh et al. | |
| 2009/0249446 A1 | 10/2009 | Jenkins et al. | |
| 2009/0254572 A1 | 10/2009 | Redlich et al. | |
| 2009/0287658 A1 | 11/2009 | Bennett | |
| 2010/0017756 A1 | 1/2010 | Wassom, Jr. et al. | |
| 2010/0050064 A1 | 2/2010 | Liu et al. | |
| 2010/0057418 A1* | 3/2010 | Li et al. | 703/10 |
| 2010/0070315 A1 | 3/2010 | Lu et al. | |
| 2010/0088583 A1 | 4/2010 | Schachter | |
| 2010/0250625 A1 | 9/2010 | Olenick et al. | |
| 2010/0251109 A1 | 9/2010 | Jin et al. | |
| 2011/0191344 A1 | 8/2011 | Jin et al. | |

OTHER PUBLICATIONS www.pss-systems.com; retrieved from www. Archive.org any linkage dated Dec. 8, 2005, 130 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag Berlin Hedelberg.

Human Capital Mangement; "mySAP . . . management"; retrieved from archive.org Aug. 18, 2009 www.sap.com.

"Microsoft Computer Dictionary", Microsoft Press, Fifth Edition, 2002, p. 499.

JISC infoNet. HEI Records Management: Guidance on Developing a File Plan. Jan 1, 2007, 7 pages.

Cohasset Associates, Inc. "Compliance Requirements Assessment, IBM DB2 Records Manager and Record-Enabled Solutions", Oct. 31, 2004, Chicago, IL, 54 pages.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls In", available at http://www.krollontrack.com/publications/ediscoverybackgroundpaper.pdf, accessed Mar. 13, 2012, National Court Reporters Association, Apr. 2006, 7 pgs.

* cited by examiner

Level 1: a single set of trends used for all matter types. 400

Level 2: a specific set of trends for each matter type. If undefined, will default to level 1. 405

Level 3: A specific set of trends at the time of reaching each matter stage and for each matter type. If undefined, will default to 2 if available, if not 1. 410

Level 4: Derived from 1, 2, and 3, further refined to distinguish individual data sources and custodians based on their cost profiles. 415

Fig. 4

Expert review example

| Forecast Parameters | Actual 500 | Typical 505 | User 510 | Forecast 540 |
|---|---|---|---|---|
| ▼ Custodians | | | | |
| Custodians in Scope 515 | 43 | 43 | 43 | 43 |
| Custodians in Collections 520 | 10 | 10 | 10 | 10 |
| Volume per Custodian (GB) 525 | 0.586 GB | 0.585 GB | 0.585 | 0.585 GB |
| Pages per Custodian 530 | 29,182 | 29,182 | 29,182 | 29,182 |
| Collection Cost Per Custodian 535 | | $200.00 | | $200.00 |
| ▶ Data Sources | | | | |
| ▶ Collections | | | | |
| ▶ Processing and Review | | | | |
| ▶ Total Cost | $129,021 | $129,021 | | $174,927 |

Fig. 5

▼ Matter lifecycle key indicators

| Do you think that... | Very likely —700 | | Very unlikely —705 | |
|---|---|---|---|---|
| ... the scope might be further modified? —710 | ◉ | ○ | ○ | ○ |
| ... there might be more collections? —715 | ◉ | ○ | ○ | ○ |
| ... more data might be sent for review? —720 | ◉ | ○ | ○ | ○ |

\* ○ = Typical    ◉ = Current value

Fig. 7

Scenario Analysis - What if? — 700

| Forecast Parameters | Actual | Typical | User | Forecast |
|---|---|---|---|---|
| ▼ Custodians — 805 | | | | |
| Custodians in Scope | 995 | 995 | 4,000 | 4,000 |
| Custodians in Collections | 76 | 125 | 286 | 286 |
| Volume per Custodian (GB) | 0.201 GB | 0.22 GB | 0.22 | 0.22 GB |
| Pages per Custodian | 8,709 | 9,267 | 9,267 | 9,267 |
| Collection Cost Per Custodian | | $200.00 | | $200.00 |
| ▶ Data Sources — 810 | | | | |
| ▶ Collections — 815 | | | | |
| ▶ Processing and Review — 820 | | | | |
| ▶ Total Cost | $606,081 | $598,068 | | $1,778,746 |

▼ Matter lifecycle key indicators — 825

| Do you think that... | Very likely | | | Very unlikely |
|---|---|---|---|---|
| ... the scope might be further modified? | ○ | ○ | ● | ○ |
| ... there might be more collections? | ● | ○ | ○ | ○ |
| ... more data might be sent for review? | ● | ○ | ○ | ○ |

\* ◎ = Typical  ● = Current value

Fig. 8

FORECASTING DISCOVERY COSTS BASED ON COMPLEX AND INCOMPLETE FACTS

CROSS REFERENCE TO RELATED APPLICATIONS

This patent application is a continuation-in-part of U.S. patent application Ser. No. 12/165,018, Forecasting Discovery Costs Using Historic Data, filed Jun. 30, 2008, and a continuation-in-part of U.S. patent application Ser. No. 12/242,478, Forecasting Discovery Costs Based on Interpolation of Historic Event Patterns, filed Sep. 30, 2008, the entirety of each of which is incorporated herein by this reference thereto.

BACKGROUND OF THE INVENTION

1. Technical Field

This invention relates generally to the field of electronic discovery. More specifically, this invention relates to predicting the cost of electronic discovery.

2. Description of the Related Art

Electronic discovery, also referred to as e-discovery or EDiscovery, concerns electronic formats that are discovered as part of civil litigations, government investigations, or criminal proceedings. In this context, the electronic form is anything that is stored on a computer-readable medium. Electronic information is different from paper information because of its intangible form, volume, transience, and persistence. In addition, electronic information is usually accompanied by metadata, which is rarely present in paper information. Electronic discovery poses new challenges and opportunities for attorneys, their clients, technical advisors, and the courts, as electronic information is collected, reviewed, and produced.

The electronic discovery process focuses on collection data from people that have knowledge about the pending litigation and the data sources that they control. These people are referred to as custodians. The data sources include work computers, home computers, mobile devices, etc. The cost of collecting data from a variety of custodians controlling a variety of data sources varies according to different parameters. Thus, there is a need for an electronic discovery system that accurately predicts the costs.

A number of electronic discovery systems provide simple calculator sheets that allow a user to enter volume and cost parameters to estimate the potential discovery cost for one matter. These tools vary in the depth and breadth of their model, and the cost equation parameters they offer, but they all lack several features. They fail to provide a means for aggregating facts in a scalable, reliable and repeatable manner. They also fail to calculate historic trend models or profiles. While they enable the user to provide input into the model and to perform scenario analysis, they cannot combine automated forecast and user feedback. As a result, parameters and relationships between parameters that are not explicitly integrated in the cost model must be manually input by the user.

The electronic discovery systems also fail to include any subjective assessment of the degree of advancement of the matter in its lifecycle, which means that any such assessment or input must be factored in by the user into all of the other input parameters. Manually inputting those parameters is so complex and time consuming that it can offset any advantages to be gained from the system.

The electronic discovery systems provide a cost equation model that is rigid and cannot easily be configured to adapt to the specific context of the customer. They do not provide any facility to aggregate cost across multiple matters, or perform analytics on the overall matter portfolio. They do not have any capability to integrate the specific nature and cost profile of an individual custodian or data source as part of the cost forecast. As a result, current electronic discovery tools are limited in application and accuracy.

SUMMARY OF THE INVENTION

The discovery cost forecasting system uses incomplete information to generate forecasts of discovery costs. The discovery cost forecasting system gathers facts, and analyzes facts for forecasting accurate costs. The facts include both facts specific to the instant matter, i.e. current facts and historical facts for similar matters. The forecasting system is fully automated, allows for manual input, or is a combination of both automatic and manual processes.

While a DCF system would work at its best by getting access to a complete picture of all facts and events related to the matter at all times, in reality, such knowledge capture is not always practical or even possible. Different processes and methods must be considered and used to insure that the best compromises are made between the completeness, timeliness and forecast accuracy enabled by the data being captured, versus the cost of capturing it. Consequently, users will need:

- A method and apparatus to gather and ingest events and facts required to enable accurate cost forecasting.
- The above, applied to both facts used as reference for actual matter activity or historical facts for matter type trend calculation, or any combination of both.
- The above, applied to both a method and apparatus that are manually executed by a human agent, fully automated between "systems" or any combination of both.

While a DCF system should build a discovery cost forecast based on the most detailed and thorough model available, it is not always possible or practical to gather or analyze appropriate facts, especially in the early days when no high quality historical facts are available. Different models, with levels of quality and accuracy that may vary significantly, need to be considered, to enable a progressive and controlled build-up of the models used over a long enough period of time. The discovery cost forecasting system generates models with different levels of granularity. The model uses a less detailed forecast when the system is lacking sufficient historical facts. As more facts are gathered, a more detailed model is provided or available according to a user's preferences. The model includes a user interface that allows the user to selectively switch between the different models. The model is fully automated, allows for manual input, or is a combination of both automatic and manual processes.

In one embodiment, the discovery cost forecasting system incorporates real-time judgment from someone that is familiar with the litigation, e.g. the litigator attorney in charge of the matter. While the discovery cost model provides an overall accurate forecast, the expert can provide more accurate information about single matters. The expert has permission to adjust actual data entry as captured by the system, adjust the value of the prediction for any of the steps used by the forecasting system to forecast cost, reprocess the complete cost forecast by substituting the adjusted value, and specify when adjustments should be permanently incorporated into the overall discovery forecast. As a result, the expert feedback improves the accuracy of the discovery forecast.

In another embodiment, the discovery cost forecasting system generates a scenario analysis that evaluates how changes to the parameters of the matter could affect the forecasted cost. The different scenarios are saved, can be further modified, and are comparable with the discovery cost forecast. The discovery cost forecasting system generates a user interface that displays the potential cost impact of fact changes derived from the facts. The facts are closely integrated with the discovery cost forecast to provide real-time feedback on how various fact elements within the discovery workflow process impact the forecasted cost. As a result, end users can evaluate how possible changes to the parameters of the matter could affect the forecasted cost and plan accordingly.

In yet another embodiment, the discovery cost forecasting system generates an estimate of the degree of advancement of the matter in its lifecycle as part of the cost forecast. The matter lifecycle status is represented as a probability that various key stages of the matter lifecycle have been reached or completed. The values of the key indicators are automatically estimated based on matter type trends, matter specific facts and events, and any end user input. The discovery cost forecasting system generates a user interface to display the current estimated values of the key indicators. A user can overwrite the key indicators to include new circumstances or facts or the expected impact of elements that are too subtle to be known or processed by the system. All overwritten data are incorporated into the current facts and are used to update the discovery cost forecasts.

In one embodiment, the discovery cost forecasting system tracks and reports on the cost associated with each data source and custodian. Variables include the volume of data created or stored, the type of information, the role and responsibility as it influences the sensitivity and relevance of data in custody, the cost of accessing the data when relevant, the transaction overhead, and the cost per volume. The generated report shows how each parameter affects the model. A profile is maintained for each data source or custodian. Data sources or custodians can be grouped according to similarity to increase the accuracy of single matter predictions. This organization provides visibility into the discovery costs, and helps optimize the retention policy and other business processes to reduce the overall costs.

The discovery cost forecasting system defines a configurable and extensible cost equation. Companies fulfill the steps in the discovery process in different ways, for example, by using their own resources or external vendors. As a result, the discovery cost forecasting system provides specificity for choosing and calibrating between different ways to account for discovery costs. This allows companies to maintain compatibility with existing business processes and cost structures, and to avoid unnecessary reliance on a limited set of pre-defined parameters.

The discovery cost forecasting system generates a user interface, referred to as a dashboard, for monitoring the entire portfolio to extract easy to understand facts, trends, and early warning signs related to discovery cost management. The dashboard identifies the most expensive legal matters based on any cost metric generated by the discovery cost forecasting system. The dashboard also tracks the most significant events within a certain period in the recent past to detect facts that represent early warning signs of an increased risk or cost within a legal matter. Lastly, the dashboard generates graphs to show the overall matter portfolio costs, their fluctuation over time, and a cost trend that indicates significant patterns for company wide risk or potential cost.

The discovery cost forecasting system is useful for estimating the cost of discovery internally and to budget for that cost accordingly. The discovery cost forecasting system can also be used as a tool for deciding whether to settle a lawsuit or where the cost of electronic discovery exceeds the cost of the amount in controversy. In one embodiment, the discovery cost forecasting system is used externally as a settlement tool to encourage opposing counsel to settle a litigation.

BRIEF DESCRIPTION OF THE DRAWINGS

FIG. 4 is a block diagram that illustrates model levels according to one embodiment of the invention;

FIG. 5 is a block diagram that illustrates a user interface for inputting information about custodians into the system according to one embodiment of the invention;

FIG. 7 is a block diagram that illustrates a user interface for inputting matter lifecycle key indicators according to one embodiment of the invention;

FIG. 8 is a block diagram that illustrates a user interface for inputting custodian information and matter lifecycle key indicators into a scenarios analysis user interface according to one embodiment of the invention;

DETAILED DESCRIPTION OF THE INVENTION

Client Architecture

Figure 1:
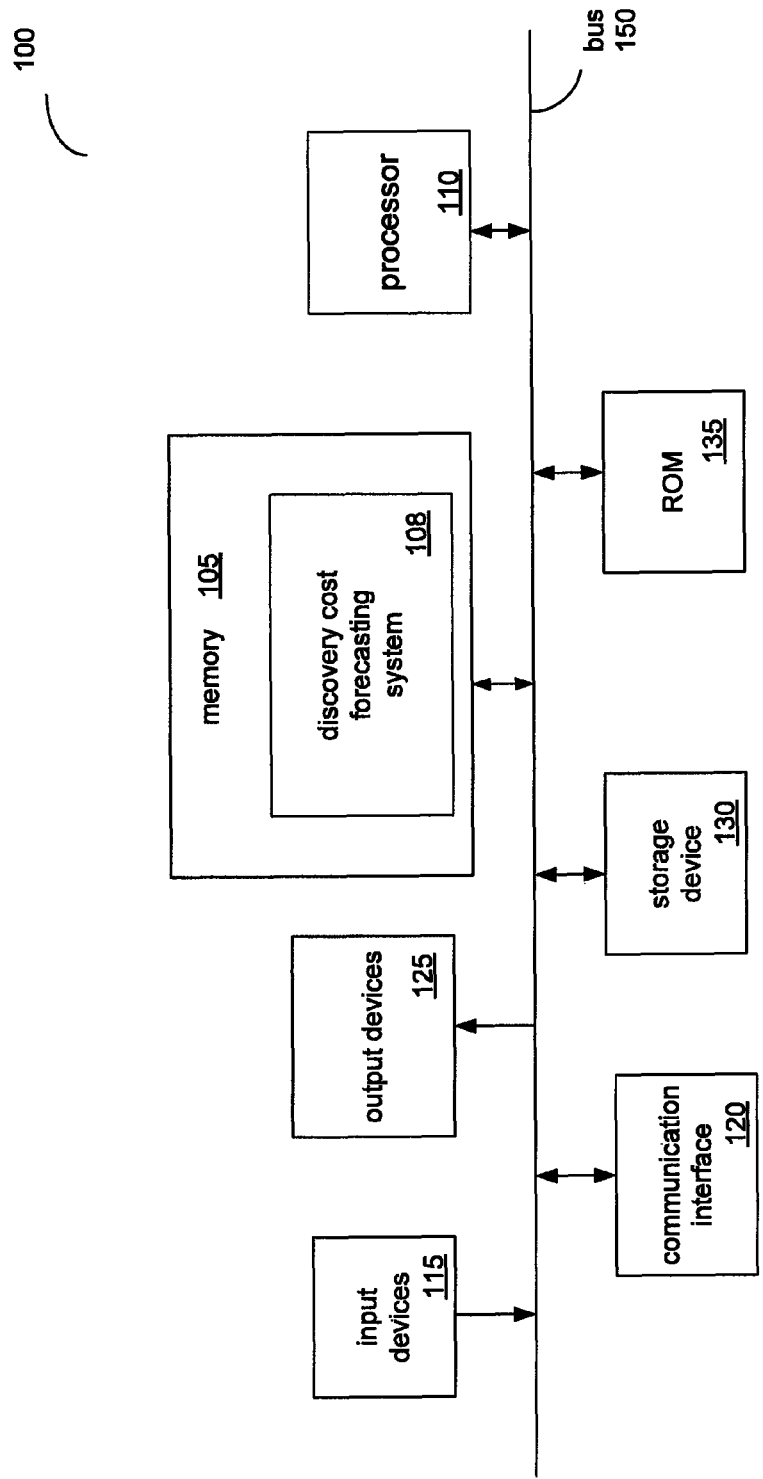
FIG. 1 is a block diagram that illustrates a client architecture according to one embodiment of the invention.

In one embodiment, the client 100 comprises a computing platform configured to act as a client device, e.g. a personal computer, a notebook, a smart phone, a digital media player, a personal digital assistant, etc. FIG. 1 is a block diagram of a client 100 according to one embodiment of the invention. The client 100 includes a bus 150, a processor 110, a main memory 105, a read only memory (ROM) 135, a storage device 130, one or more input devices 115, one or more output devices 125, and a communication interface 120. The bus 150 includes one or more conductors that permit communication among the components of the client 100.

The processor 110 includes one or more types of conventional processors or microprocessors that interpret and execute instructions. Main memory 105 includes random access memory (RAM) or another type of dynamic storage device that stores information and instructions for execution by the processor 110. ROM 135 includes a conventional ROM device or another type of static storage device that stores static information and instructions for use by the processor 110. The storage device 130 includes a magnetic and/or optical recording medium and its corresponding drive.

Input devices 115 include one or more conventional mechanisms that permit a user to input information to a client 100, such as a keyboard, a mouse, etc. Output devices 125 include one or more conventional mechanisms that output information to a user, such as a display, a printer, a speaker, etc. The communication interface 120 includes any transceiver-like mechanism that enables the client 100 to communicate with other devices and/or systems. For example, the communication interface 120 includes mechanisms for communicating with another device or system via a network.

The software instructions that define the discovery cost forecasting (DCF) system 108 are to be read into memory 105 from another computer readable medium, such as a data storage device 130, or from another device via the communication interface 120. The processor 110 executes computer-executable instructions stored in the memory 105. The instructions comprise object code generated from any compiled computer-programming language, including, for example, C, C++, C# or Visual Basic, or source code in any interpreted language such as Java or JavaScript.

Forecasting System Architecture

Figure 2:
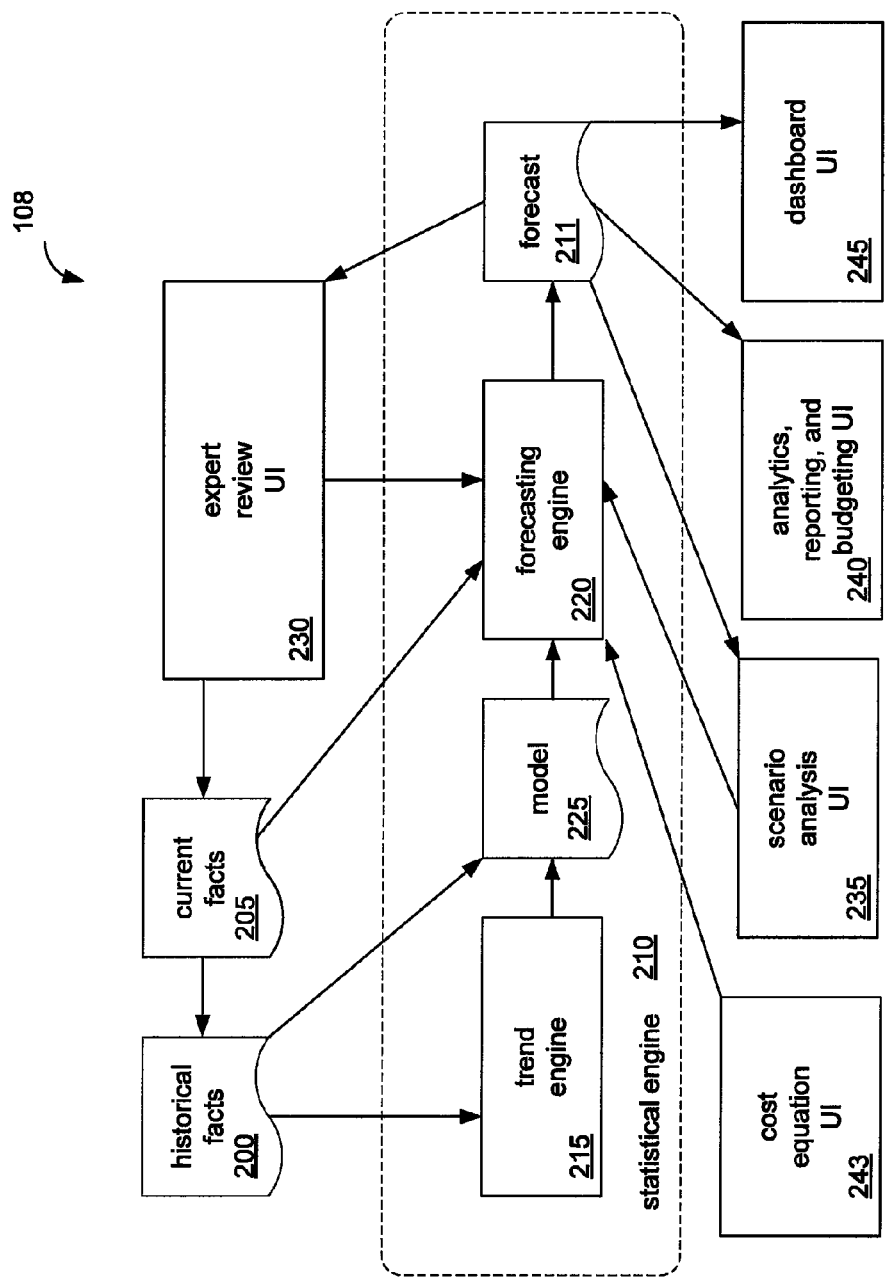
FIG. 2 is a block diagram that illustrates a system for forecasting discovery costs according to one embodiment of the invention.

FIG. 2 is a block diagram that illustrates the system components for the DCF system 108 that is illustrated in FIG. 1. Historical facts 200 are fed into the trend engine 215 which recognizes trends and seasonality components in the historical events. Persons of ordinary skill in the art will recognize that the historical facts 200 and current facts 205 can be stored in the same database, in separate databases, or any combination thereof. The facts are input into a statistical engine 210 that comprises a trend engine 215 and a forecasting engine 220. The current facts 205 and historical facts 200 are further analyzed to produce the model 225 which is transmitted to the forecasting engine 220 along with current facts 205 and input received through the expert review user interface (UI) 230. The forecasting engine 220 generates a forecast 211.

The expert review UI 230 is designed to visualize the forecasted data and to allow for expert review data entry. Additionally, the expert review UI 230 can be used to enter missing facts about the matter.

The statistical engine 210 uses the forecast 211 to generate multiple UIs. In FIG. 2, the user interfaces are illustrated as a n expert review UI 230 for receiving information from someone familiar with the current discovery; a scenario analysis UI 235 for forecasting the cost of discovery in different scenarios; an analytics, reporting, and budgeting UI 240 for estimating a degree of advancement of the matter in its life-cycle; the cost equation UI 243 for receiving user-defined cost parameters; and a dashboard UI 245 for highlighting early warnings. Persons of ordinary skill in the art will recognize that the UIs could be combined into one UI.

Gathering and Ingesting Events and Facts

The facts used in the statistical engine 210 are divided into three main categories: (1) complete facts where information is provided and is accurate; (2) incomplete facts where only a partial level of details is provided and non-critical data is missing; and (3) missing facts where critical data is missing, which makes the information useless.

The accuracy and reliability of the discovery cost forecast depends upon how many of the facts are in the second and third categories. To maximize the quality of the forecast, the DCF system 108 categorizes differences between the sources of facts and the implied limitations.

The DCF system 108 accepts a variety of data input streams, each of them with various requirements on levels of detail and accuracy. In one embodiment, the facts are extracted directly from a discovery workflow governance tool that has access to a complete detailed list of events, such as the Atlas LCC or Atlas for IT modules developed by PSS Systems® of Mountain View, Calif. Details include any of an exact date and time, related targets, document processes, size, type, equivalent page count, additional page count, similar information for all documents extracted from original containers, e.g. zip, .msg, .pst, etc., and status and metadata tags that are relevant to the applicable step in the process. In one embodiment, the data source is closely integrated with the DCF system 108 and a collection tracking tool, which is also part of the Atlas Suite developed by PSS Systems® of Mountain View, Calif. In this type of system, when additional details become available, the information is automatically processed in the background and displays are updated to reflect the most recent information.

Figure 3:
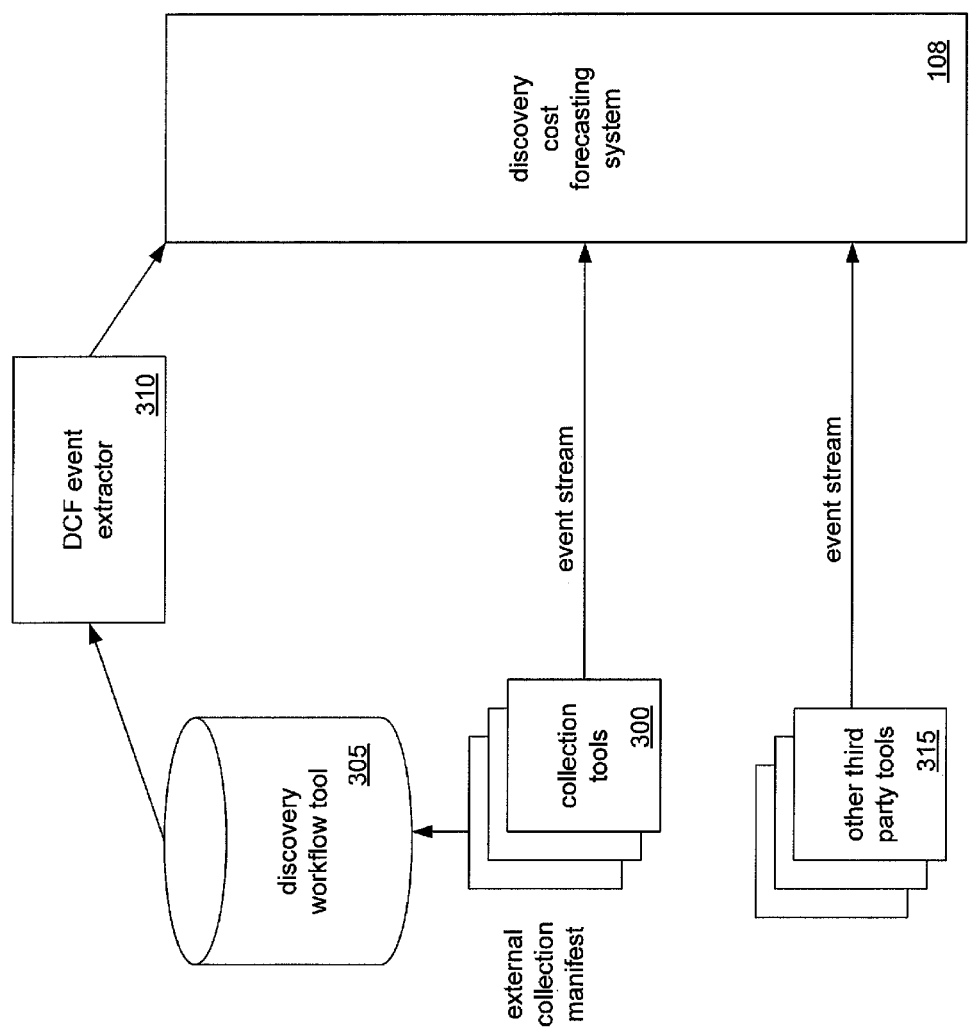
FIG. 3 is a block diagram that illustrates a variety of source for DCF events and how they are being ingested according to one embodiment of the invention.

FIG. 3 is a block diagram that illustrates a variety of source for DCF events and how they are being ingested. The DCF system 108 uses external collection tools 300 to collect a DCF manifest. The manifest is gathered by a discovery workflow tool 305, such as the Atlas Suite developed by PSS Systems® of Mountain View, Calif. Extracted events are transmitted to the DFC event extractor 310, which transmits an event stream to the DCF system 108. The DCF system 108 also receives event streams directly from the collection tools 300 and the other third party tools 215. Additional information regarding this type of system can be found in U.S. application Ser. No. 11/963,383, which is herein incorporated by reference. The DCF manifest publication is typically a one-time event that does not require the type of updating that occurs when collecting information directly from a discovery workflow governance tool.

In one embodiment, a manifest creation tool generates an output that is manually uploaded. The user enters high-level information for each log, plan, etc. Because manual data entry is less accurate and detailed than automatic generation of data, the level of detail is typically lower.

The facts received by the DCF system 108 are organized according to metadata that is associated with the facts. For example, the DCF system 108 captures any of a file size; the file type, which is used to extrapolate equivalent page count from the size; and the true equivalent page count, which is computed locally by analyzing the real data itself. This information is captured both directly and from information that is contained within a document that is itself a container or archive, e.g. Zip, PST, email, etc. In addition, the DCF system 108 tracks the timing of the collection, the source of custody from which the data was collected, i.e. the associated target, which is typically a data source or custodian, and metadata tags. The metadata tags indicate which documents were culled, which documents went through formal review, which documents were produced, and which vendor was responsible for culling, review, production, and other code or classification-indicating fees, rates, or other relevant cost parameters. All the captured information is stored in a DCF database and any remaining incomplete data is identified and presented to a user who has the ability to reconcile the data.

The information is manually input or automatically received by the DCF system 108 using a well-defined input format. As a result, the DCF system 108 processes the information according to levels of granularity and detail.

Modeling the Data

The trend engine 215 generates several different types of models with different levels of granularity that each enables more or less refined and accurate cost forecasts.

In one embodiment, four different model levels are generated. Level 1 includes a default cost profile across all matters and for all matter types. Level 2 is similar to level 1, but uses a different profile for each matter type. Level 3 is similar to level 2, but with a different profile for each matter type based on which stage in the matter lifecycle has been reached. Level 4 is derived from any of level 1, 2, or 3, by distinguishes between individual data sources and custodians based on their individual cost profile or cost profile category.

The different models are based on different quantities or qualities of input data. The DCF system 108 displays a particular level based on the available data. FIG. 4 is a diagram that illustrates four levels of the discovery cost forecasting model.

Levels 1 400 and 2 405 are manually configured using available data and proper analysis from in-house staff or external consultants. Level 1 400 is preferred for rare matter types where the cost of gathering sufficient data to use a level 2 405 model is prohibitively expensive in cost or resources. For matter types that have either high volume of occurrence, unusually high total cost or otherwise unusual profiles, using the specifically configured level 2 405 model delivers significantly more accurate forecast. These levels will be used more frequently when the DCF system 108 is being used for the first few times because the system lacks sufficient historical facts 200 to generate a detailed model 225.

Levels 3 410 and 4 415 are generated through automated trend analysis based on high-quality facts captured by the DCF system 108 that are accumulated over long enough periods of time to represent proper historical facts 200.

The DCF model 225 is defined as a set of parameters or statistical distributions. A control system selectively switches between the different models within the same matter type or falls back to the default model. The switching is dependent upon a quality assessment of the different model levels available. The quality assessment and switching happens at the parameter level. The control system would use parameter distributions from the highest model available with sufficient quality of the historical data. The quality assessment is based on the sample size, time distribution, source of the data, etc. or any combination of the above. In one embodiment, the DCF system 108 uses a consistent group of parameters so that values for the parameters come from the same model level. For example, the number of data sources or custodians marked for data collection is correlated with the number of data sources or custodians included in the scope of discovery and the parameters should originate from the same model level.

Groups of consistent parameters are identified. The DCF system 108 receives a quality assessment metric for each parameter or group of parameters. Quality is assed based on the number of samples used to build a statistic distribution. Thresholds are configured so that each subsequent level is more accurate than the previous level. The DCF system 108 can enforce a particular model number for a given matter type by configuring different threshold transitions between the different model levels or by selectively defining the model number for a matter type.

In one embodiment, the DCF system 108 automatically assesses which model level to use based on availability, quality assessment, and threshold configuration for the switch. This is useful when users prefer to see the greatest amount of detail available.

The DCF system 108 can be configured to switch between the different models in any of the following ways: fully manual, semi-automatic based on transition rules that are manually configured, or fully automatic based on fundamental rules that are automatically enforced, or a combination of all three.

Expert Feedback

While the DCF system 108 generates a forecast 211 that is accurate for the overall portfolio, single matters are predicted with less accuracy. The random and unexpected nature of any single discovery process can be better comprehended and evaluated by someone familiar with the discovery process. As a result, the expert review UI 230 incorporates an expert's real-time judgment and knowledge. For example, the DCF system 108 may estimate that the collection process stage of the discovery is only 50% complete. The litigator, on the other hand, knows that the collection process is complete. This knowledge can have a dramatic effect on the discovery cost forecast because the cost incurred by collecting data is complete. The expert review UI 230 allows the litigator to overwrite the DCF system's 108 estimate.

The forecasting engine 220 receives the information from the expert review UI 230 and overwrites current facts 205 with the new information. The forecasting engine 211 reviews, cross-checks, complements, or adjusts the forecast 211 and displays the results. In the above example, the result will be a downwardly adjusted estimate for the discovery cost forecast.

The expert UI 230 allows the expert to adjust actual data entry as captured by the DCF system 108 for any of the parameters tracked as input values. The input covers the existence, value, and timing of any events. The expert UI 230 overwrites the current facts 205 with the facts provided by the expert and continues to use the unchanged current facts and predicted values. The expert UI 230 can be manually adjusted to specify whether the new facts are stored permanently and incorporated into the current facts 205 or stored separately.

The expert review UI 230 generates an organized display for a user to select different categories of current facts to be changed. In one embodiment, the current facts 205 are organized according to the following categories: custodians, data sources, collections, and processing and review.

FIG. 5 is an example of an expert review UI 230 that allows the expert to change current facts for the custodians. The interface includes columns for the actual data 500, i.e. the data that is pertinent to the discovery process. The actual data 500 is compared to typical data 505, i.e. historical data for that particular subject matter type. The user column 510 allows an expert to change the custodians in scope 515, the custodians in collections 520, the volume per custodian 525, the pages per custodian 530, and the collection cost per custodian 535. The statistical engine 210 receives the information input by the expert and modifies the forecast column 540 according to the changes.

Figure 6:
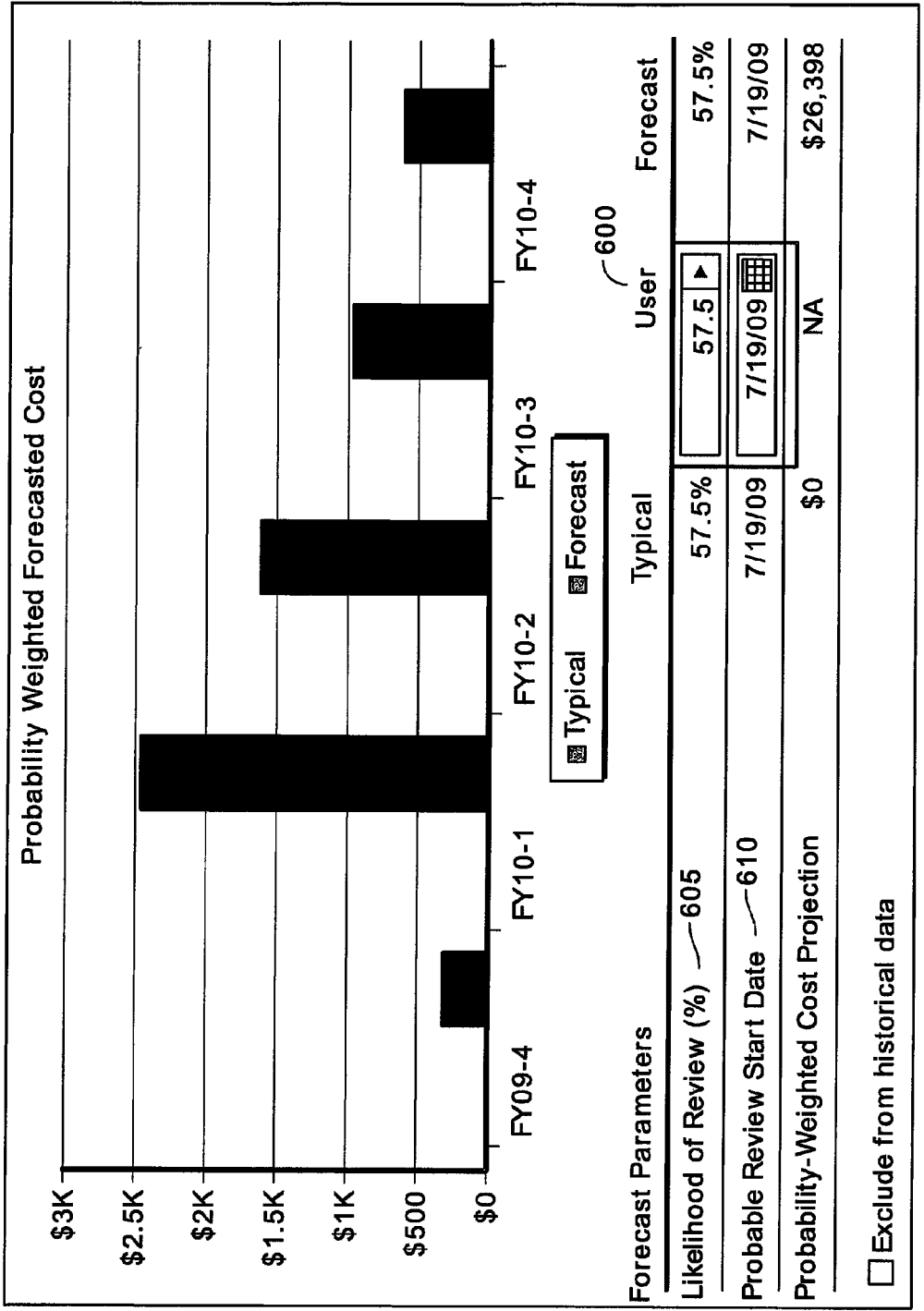
FIG. 6 is a block diagram that illustrates a user interface for adjusting forecast parameters according to one embodiment of the invention.

The expert review user interface 250 also allows an expert to adjust timing and probability data. FIG. 6 is an example of a user interface where the user column 600 provides a means for adjusting the likelihood of review (%) 605 and the probable review start date 610 according to one embodiment of the invention. Altering this information adjusts the discovery cost for each quarter. For example, the expert may know that the discovery review process will be delayed for a quarter, which offsets the discovery costs for a quarter.

In one embodiment, the expert review user interface 250 includes key matter lifecycle indicators that are modified to reflect the degree of progress within the scoping, collections, and export processes of e-discovery. FIG. 7 is a block diagram that illustrates an example where the expert selects data points on a sliding scale from very likely 700 to very unlikely 705 according to one embodiment of the invention. The expert provides input about the expert's perception that the scope might be further modified 710, there might be more collections 715, and more data might be sent for review 720. The matter lifecycle key indicators are described in more detail below.

The forecasting engine 220 highlights inconsistent or incomplete data by performing a cross-check between different sources of data, comparing values against trends or comparables from the model, and highlighting the highest deviation from the normalcy standard both in absolute and relative form from a typical profile for relevant matter type and stage to detect errors and abnormalities. New facts are created or existing facts are modified without conflicting with existing or newly created data from manual or automated sources. Being able to overwrite any intermediate parameters avoids the blocking effect of other changes in the model due to changing facts. The changes are audited or reviewed by including appropriate metadata, e.g. comments, reasons, time of modification, source of modification, etc.

Using the expert review UI 230, the expert user is able to independently adjust the value of the prediction for any of the steps used by the system to forecast cost. The forecasting engine 220 implements the cost forecasting algorithm as a series of steps such that any of the intermediate values calculated or parameters used as input can be overwritten based on the expert user input, only when defined, and would otherwise continue to use the best estimate from the forecasting algorithm.

The forecasting engine 220 adjusts the discovery cost forecast based on expert information received through the expert review UI 230. First, the expert uses the expert review UI 230 to overwrite the current facts 205 and intermediate values generated by the forecasting algorithms. The forecasting engine 220 modifies current facts 205 that relate to the data received from the expert accordingly. For example, modifying the estimated value for "collected volume" alters the estimated value for "collected page count" because they are closely tied together. The forecasting engine 220 updates the forecast 211 to incorporate the new facts.

In one embodiment, the expert review UI 230 indicates when changes are persistent and used as part of the overall discovery cost forecasting for the portfolio for future calculations.

Scenario Analysis

The DCF system 108 includes a scenario analysis for the user to evaluate how possible changes to the parameters of the matter could affect the forecasted cost. In one embodiment, individual matter parameters can be changed and the entire set of parameters can be saved as a scenario. In one embodiment, the scenarios are reusable, e.g. what if the number of custodians is defined as final. Individual scenario or series of scenarios can be simulated to quantify and visualize the impact of changing key matter parameters.

In one embodiment of the invention the scenario analysis parameters are organized according to the following categories: custodian, data source, collections, processing and review, probability, budgeting, and extended cost. Within the custodian category, the user is able to specify the number of custodians in scope, the number of custodians collected, the volume of collection per custodian, the page count collected per custodian, and the collection cost per custodian.

FIG. 8 is a block diagram that illustrates an example of a scenario analysis UI 235 for a "what if" scenario according to one embodiment of the invention. The user column 800 allows the user to input various parameters for custodians 805, data sources 810, collections 815, and processing and review 820. The user also modifies matter lifecycle key indicators 825 to obtain a better scenario analysis.

The DCF system 108 stores, organizes, and compares scenarios while maintaining an audit trail with all the change logs. As a result, the process of estimating potential cost implications for a single scenario or a series of scenarios is reliable and repeatable. In one embodiment of the invention, the scenario is persisted and integrated into the overall matter portfolio estimate that affects the entire discovery budget, thereby becoming user feedback.

In one embodiment, the scenario analysis UI 235 generates a display of the potential cost impact of fact changes from the source where the facts are being captured or introduced. In this embodiment, the DCF system 108 is closely integrated with a discovery workflow governance application such as the Atlas Suite made by PSS Systems® of Mountain View, Calif. The DCF system 108 compares the current forecast against the scenario that integrates the changes being edited and reflects the overall forecast change as an immediate warning of the consequences of the changes. In this case, the change alert UI can be directly integrated into discovery workflow governance application.

Matter Lifecycle Key Indicators

Matter lifecycle key indicators estimate a degree of advancement of the matter in its lifecycle as part of the cost forecast. The matter lifecycle status is represented as a probability that various key stages of the matter lifecycle, i.e. key indicators have been reached. The matter lifecycle status is represented by a model with competing lifecycles of activities that occur in the context of the legal matter including any of scoping, early assessment, collections, export to review, and data production. The DCF system 108 automatically estimates the values of the key indicators based on matter type trends, matter specific facts, events, and any end user input. The lifecycle status of each activity is automatically estimated by comparing the timing, quantitative characteristics of the matter at the time of reaching a milestone event for a given activity, event patterns limited to those relevant to a specific activity, matter type trends, and user input.

The DCF system 108 monitors event patterns for any signs of inactivity and adjusts the indicators appropriately. For example, if there is a long period of time where the scope remains constant, then based on the historical data, the chances of additional changes in the scope of e-discovery are likely to decrease further. This lowers the scope activity key matter lifecycle indicator.

The current estimated values of the key indicators are displayed to the user. The scenario analysis 235 user interface allows the user to change the estimate for each activity to indicate the actual status of the activity when the system estimation is unsuitable. For example, the user can edit an assessment of the completion of key milestones, such as "scoping is final" with qualitative options like "very unlikely," "unlikely," "likely," and "very unlikely."

The forecasting engine 220 automatically adjusts the cost forecasting prediction to reflect any adjustment made by the user. The forecasting engine 220 uses a weighted average of multiple prediction tracks. Each track represents a model of the dependencies between the different parameters of a matter, as they exist at different points in time during the lifecycle of the matter. The DCF system 108 employs a weighting algorithm that determines which track is most likely to best reflect the current state of the matter based on the matter lifecycle key indicators.

In one embodiment, the following tracks are used. Track 1 is for an early stage when no specific events are known. A matter is expected to behave as an average matter of its matter type. For all tracks after track 1, a matter size is evaluated by comparing its current scope to the scope of a previous matter of the same type at a similar phase in the lifecycle. The forecasting engine 220 uses the comparison to predict the eventual size of the matter. Track 2 is applicable when scoping has begun. Track 3 is applicable once collection starts. Track 4 is applicable once the scope is finalized. Track 5 is applicable once the current collection is finalized. Track 6 is application once the volume of data sent for review is finalized.

The tracks are weighted based on an assessment of the level of completion of three key matter lifecycle indicators: scoping completeness, collection completeness, and export to review completeness.

Forecasting Cost on a Per Data Source/Custodian Basis

Some of the data sources within an organization, geography, or a department can have a disproportionate contribution to the overall discovery cost budget. The DCF system 108 provides a set of analytical tools and a methodology that easily identifies these data sources, custodians, organizations, etc. and addresses issues triggered by mismanagement of a compliance and retention policy that results in high costs. The DCF system 108 continuously monitors the e-discovery costs for a specific data source and custodians or groups of thereof.

The DCF system 108 evaluates, identifies, and manages data sources and custodians based on its discovery cost profiles. The profile data is organized on a per matter type basis. In one embodiment, the data sources and custodians can be organized in categories based on the potential and factual cost implications. Additionally, users are able to further refine the categories using the analytics, reporting, and budgeting UI 240, The forecasting engine 220 forecasts discovery costs that are specific to a particular data source or custodian. The statistical engine 210 automatically categorizes data sources based on the known facts and forecasted costs. The statistical engine 210 reports on the most expensive data sources, which include the ability to report per organization using analytics, reporting, and budgeting UI 240.

The trend engine 215 analyzes the history of the collections as it applies to various data sources and custodians from the data across the organization. The data sources and custodians are organized into categories based on the potential and factual cost implications. This includes any of data on the collection volumes, timing of collections, frequency and pace of collections, types of files being collected, etc.

A discovery workflow governance tool such as the Atlas Suite uses per data source and per custodian cost information for estimating potential cost implications when changing the scope of a matter, planning collections, holds, and for other activities.

Configurable and Extensible Cost Equation

The DCF system 108 defines permutations of the cost equation including the ability to extend the cost equation by defining new user-defined cost parameters. In one embodiment, the user modifies the cost equation through a cost equation UI 243. The parameters remove the constraint of having to represent the real cost structure using only a limited set of predefined parameters from basic cost models. The parameters are defined as global, which is mandatory; per matter type, which supersedes the global parameters if defined; and per matter, which supersedes the per matter type or global parameters if defined. The parameters are used in the cost equation and are combined with any of actual, model, user-defined, and forecasted parameters that were calculated during the forecast.

The parameters include the number of custodians or data sources in scope and collections; the volume of collection, culling, export to review, and production in GB or pages; the duration of the matter; and the duration of the storage or hosting period. In one embodiment, the parameters also represent the fixed cost component of overall discovery cost. Groups of parameters are managed as predefined lists or profiles associated with a business unit within the organization or external entity such as a law firm etc. that can still be applied to the overall cost equation, e.g. the law firm price lists including review cost per page, forensic services, processing services, etc. Centralized cost parameter management helps to maintain integrity across multiple price lists and makes it easier for the legal user to optimize prices across various service providers.

Matter Portfolio Monitoring

The DCF system 108 monitors the entire matter portfolio. The DCF system 108 includes a dashboard UI 245 that highlights early warnings. Triggers for an early warning include adding an unusually large number of custodians, data sources, collections to export for review, or new matters. "Unusual" is either defined as an absolute or a relative scale as compared to the historical number for the same subject matter type. The dashboard UI 245 narrows down the source including specific matters, requests, holds, collections, custodians, data sources, and specific individual events tied to the warning sign. The dashboard UI 245 identifies the most expensive matter based on any cost metric, e.g. total cost, review cost, collection cost, etc.; based on different target periods, including potential total forecasted cost; based on costs incurred or estimated so far; and based on cost accrued or forecasted to be accrued within a certain period, e.g. quarter, year, etc. The combination of historical trend analysis, near real time event processing, and the rule based notification subsystem provide an efficient mechanism for the matter portfolio monitoring.

The dashboard UI 245 allows the user to define notification triggers. One example of a notification trigger is when a matter reaches a certain number of targets in scope or collections. This can be on a relative scale. Another notification is for collection volume when the export for review volume reaches an absolute volume in GB, pages, or is relative to other matters within the same subject matter type. Lastly, a user is notified when a large number of new matters are created in a short period of time in absolute or relative form. The notification takes the form of an alert or an action item that has descriptive data pertaining to the matter, details of the source event, and an explanation of the triggering logic.

Flow Diagram

Figure 9A:
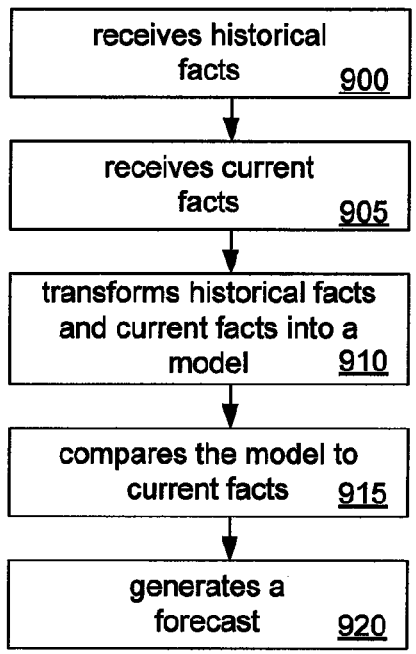
FIG. 9A is a flow diagram that illustrates the steps for forecasting e-discovery according to one embodiment of the invention.

FIG. 9A is a flow diagram that illustrates steps for using the DCF system according to one embodiment of the invention. The discovery cost forecasting system 108 is stored on a computer that receives 900 historical facts 200. The computer also receives 905 current facts 205. The computer transforms 910 the historical facts 200 and the current facts 205 into a model 225. The computer compares 915 the model 225 to the current facts 205. The computer generates 920 a forecast 211 based on the comparison.

Figure 9B:
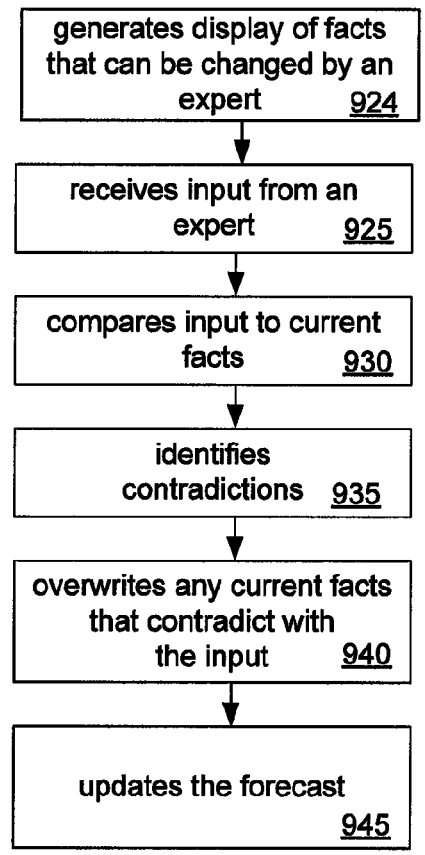
FIG. 9B is a flow diagram that illustrates the steps for including expert review into the forecast discovery according to one embodiment of the invention.

FIG. 9B is a flow diagram that illustrates steps for modifying the DCF system in response to receiving expert input. The computer generates 924 a display of facts that can be changed by an expert. The computer receives 925 input from the expert. The computer compares 930 the input to the current facts and identifies 935 any contradictions. The computer overwrites 940 any current facts that contradict with the input. The computer updates 945 the forecast.

Figure 9C:
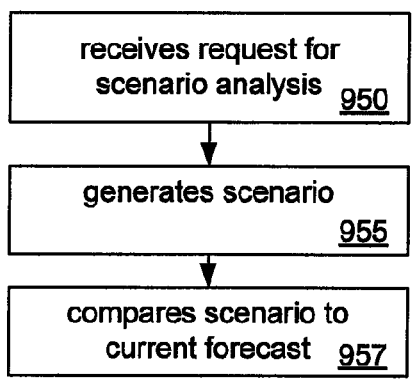
FIG. 9C is a flow diagram that illustrates the steps for generating a scenario analysis according to one embodiment of the invention.

FIG. 9C is a flow diagram that illustrates steps for generating a scenario analysis. The computer receives 950 a request for a scenario analysis. Specifically, the user will modify one or more variables, such as the number of custodians, to see how it affects the discovery cost. The computer generates 955 a scenario. The computer compares 957 the scenario to the current forecast.

Figure 9D:
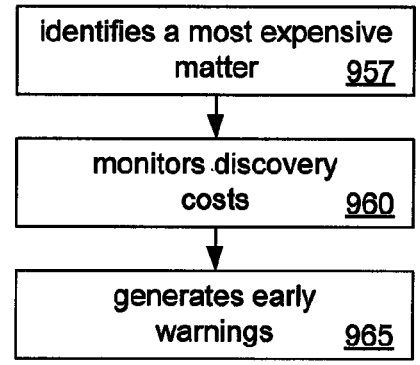
FIG. 9D is a flow diagram that illustrates the steps for monitoring discovery costs according to one embodiment of the invention.

FIG. 9D is a flow diagram that illustrates steps for monitoring the discovery cost forecast. The computer identifies 947 a most expensive matter in the discovery.

The computer monitors 955 the discovery cost and generates 960 early warnings. The early warnings are either preconfigured, e.g. set at threshold levels or specified by a member of the legal group.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A system for forecasting discovery costs comprising:
a memory; and
a processor, the processor configured to implement instructions stored in the memory, the memory storing executable instructions, the processor comprising:
 a trend engine that receives historical facts relating to past and current discovery and generates at least one of a plurality of models modeling discovery cost forecasts based on the historical facts; and
 a forecasting engine that receives the at least one of the plurality of models and current facts, generates a discovery cost forecast for a current discovery process based on the at least one of the plurality of models and the current facts, including automatically switching between the plurality of models based on quality assessments of the plurality of models, estimates values of key lifecycle indicators that indicate a degree of advancement of the current discovery process, adjusts the values of key lifecycle indicators based on monitoring event patterns of the current discovery process for inactivity, and adjusts the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of the current discovery process based at least in part on the lifecycle indicators, wherein each of the plurality of prediction tracks represents a model of dependencies between parameters of a matter as they exist at points in time during a lifecycle of the current discovery process.

2. The system of claim 1, wherein the trend engine generates a model that includes a default cost profile across all matter types.

3. The system of claim 1, wherein the trend engine generates a model that includes a default cost profile for each matter type.

4. The system of claim 3, wherein the model is manually configured.

5. The system of claim 1, wherein the trend engine generates a model that includes a default cost profile for each matter type based on which stage in a matter lifecycle has been reached by the discovery.

6. The system of claim 1, wherein the trend engine generates a model that distinguishes between individual data sources and custodians based on their individual cost profile or cost profile category.

7. A computer-implemented method for forecasting discovery costs on a computer comprising a processor and a memory, the processor configured to implement steps stored in the memory, comprising the steps of:
 receiving, by the computer, historical facts about past and current discovery;
 assessing, by the computer, a level of quantity and quality of the historical facts;
 transforming, by the computer, the historical facts and the current facts into one of a plurality of models modeling discovery cost forecasts for a current discovery process based on the historical facts;
 estimating values of key lifecycle indicators that indicate a degree of advancement of the current discovery process;
 adjusting the values of key lifecycle indicators based on monitoring event patterns of the current discovery process for inactivity; and
 adjusting the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of the current discovery process based at least in part on the lifecycle indicators, wherein each of the plurality of prediction tracks represents a model of dependencies between parameters of a matter as they exist at points in time during a lifecycle.

8. A system for forecasting discovery costs comprising:
a memory; and
a processor, the processor configured to implement instructions stored in the memory, the memory storing executable instructions, the processor comprising:
 a trend engine that receives historical facts relating to past and current discovery, and generates at least one of a plurality of models modeling discovery cost forecasts based on the historical facts,
 a cost equation user interface to configure parameters to enable and adjust different components of an overall cost equation, including adjusting the overall cost equation to calibrate between different ways to account for discovery costs, and
 a forecasting engine that generates a discovery cost forecast for a current discovery process using the configurable cost equation based on the model, the current facts, and the cost equation parameters, that estimates values of key lifecycle indicators that indicate a degree of advancement of the current discovery process, that adjusts the values of key lifecycle indicators based on monitoring event patterns of the current discovery process for inactivity, and that adjusts the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of the current discovery process based at least in part on the lifecycle indicators, wherein each of the plurality of prediction tracks represents a model of dependencies between parameters of a matter as they exist at points in time during a lifecycle.

9. The system of claim 8 wherein the cost equation parameters are defined as any of: global across all matter types, for each matter type, or for a specific matter.

10. The system of claim 9, wherein global parameters are mandatory, per matter type parameters supersede global parameters if defined, and per matter parameters supersede any of the per matter type parameters or global parameters if defined.

11. A computer-implemented method for forecasting discovery costs on a computer comprising a processor and a memory, the processor configured to implement steps stored in the memory, comprising the steps of:
receiving, by the computer, historical facts about current and past discovery;
generating, by the computer, at least one of a plurality of models modeling discovery cost forecasts based on the historical facts;
receiving, by the computer, a plurality of cost equation parameters used to configure parameters to enable and adjust different components of an overall cost equation, including adjusting the overall cost equation to calibrate between different ways to account for discovery costs;
generating, by the computer, a discovery cost forecast for a current discovery process using a configurable cost equation based on a model, the current facts, and the cost equation parameters;
estimating values of key lifecycle indicators that indicate a degree of advancement of the current discovery process;
adjusting the values of key lifecycle indicators based on monitoring event patterns of the current discovery process for inactivity; and
adjusting, by the computer, the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of the current discovery process based at least in part on the lifecycle indicators, wherein each of the plurality of prediction tracks represents a model of dependencies between parameters of a matter as they exist at points in time during a lifecycle.

12. The method of claim 11, further comprising the step of:
receiving, by the computer, cost equation parameters defined as any of: global across all matter types, for each matter type, or for a specific matter.

13. The method of claim 11, wherein matter parameters are used if defined, per matter type parameters are used if defined and no equivalent matter parameters are defined, and global parameters are used otherwise.

14. A system for forecasting discovery costs comprising:
a memory; and
a processor, the processor configured to implement instructions stored in the memory, the memory storing executable instructions, the processor comprising:
a trend engine that receives historical facts relating to past and current discovery, and generates at least one model modeling discovery cost forecasts based on the historical facts;
a forecasting engine that generates a discovery cost forecast for all current matters based on the at least one model, the current facts for each matter, that estimates values of key lifecycle indicators that indicate a degree of advancement of each matter, that adjusts the values of key lifecycle indicators based on monitoring event patterns of each matter for inactivity, and that adjusts the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of each matter based at least in part on the lifecycle indicators, wherein each of the plurality of prediction tracks represents a model of dependencies between parameters of a matter as they exist at points in time during a lifecycle; and
a dashboard user interface (UI) for monitoring cost related characteristics and statistics across an entire discovery matter portfolio, including triggering a warning based on one or more of: a number of custodians, a number of data sources, a number of collections to export for review, and a number of new matters, as compared with historical trends.

15. The system of claim 14, wherein the dashboard UI tracks particular events within a certain period in the past to detect facts that represent warning signs of a risk of increased cost in the future.

16. The system of claim 14, wherein the dashboard UI is configured to notify a user through display or alerts whenever a particular event occurs.

17. The system of claim 14, wherein the dashboard UI identifies at least one most expensive matter based on any of a cost metric, a different target period, a cost incurred, a cost estimated, a cost accrued, and a cost forecasted.

18. The system of claim 14, wherein the dashboard UI identifies any of:
a data source, a custodian, a category of data sources, and a category of custodians by discovery cost.

19. A computer-implemented method for forecasting discovery costs comprising a processor and a memory, the processor configured to implement steps stored in the memory, comprising the steps of:
receiving, by the computer, historical facts related to past and current discovery;
generating, by the computer, at least one model modeling discovery cost forecasts based on the historical facts;
generating a discovery cost forecast for all matters based on the at least one model and the current facts for each matter;
estimating values of key lifecycle indicators that indicate a degree of advancement of each matter;
adjusting the values of key lifecycle indicators based on monitoring event patterns of each matter for inactivity;
adjusting the discovery cost forecast based at least in part on actual status of the key lifecycle indicators received from a user, the discovery cost forecast being adjusted using a weighted average of a plurality of prediction tracks that are weighed to determine which one of the plurality of prediction tracks is most likely to reflect a current state of each matter based at least in part on the lifecycle indicators, wherein each of the plurality of prediction tracks represents a model of dependencies between parameters of a matter as they exist at points in time during a lifecycle; and
monitoring, by the computer, cost related characteristics and statistics across an entire discovery matter portfolio, including triggering a warning based on one or more of: a number of custodians, a number of data sources, a number of collections to export for review, and a number of new matters, as compared with historical trends.

20. The method of claim 19, further comprising the step of:
tracking, by the computer, a particular event within a certain period in a past to detect facts that represent warning signs of a risk of increased cost in the future.

21. The method of claim 19, further comprising the step of:
identifying, by a computer, at least one most expensive matter based on any of a cost metric, a different target period, a cost incurred, a cost estimated, a cost accrued, and a cost forecasted.

22. The method of claim 19, further comprising the step of:
notifying a user, by the computer, through display or alerts whenever a particular event occurs.

* * * * *